United States Patent
Park et al.

(10) Patent No.: US 9,137,741 B2
(45) Date of Patent: Sep. 15, 2015

(54) METHOD OF SCANNING CELLS BASED ON LBS INFORMATION AND SELECTING HETEROGENEOUS CELLS

(75) Inventors: Gi Won Park, Anyang-Si (KR); Ki Seon Ryu, Anyang-Si (KR); Jin Lee, Anyang-Si (KR)

(73) Assignee: LG Electronics Inc., Seoul (KR)

(\*) Notice: Subject to any disclaimer, the term of this patent is extended or adjusted under 35 U.S.C. 154(b) by 450 days.

(21) Appl. No.: 12/371,329

(22) Filed: Feb. 13, 2009

(65) Prior Publication Data

US 2009/0213812 A1      Aug. 27, 2009

(30) Foreign Application Priority Data

Feb. 15, 2008     (KR) .................. 10-2008-0013946

(51) Int. Cl.
*H04Q 7/10*     (2006.01)
*H04W 48/16*    (2009.01)
(Continued)

(52) U.S. Cl.
CPC .............. *H04W 48/16* (2013.01); *H04W 36/32* (2013.01); *H04W 48/18* (2013.01); *H04W 64/006* (2013.01)

(58) Field of Classification Search
CPC .... H04W 64/00; H04W 48/10; H04W 84/045
USPC .............. 455/436, 437, 438, 439, 440, 456.1, 455/446, 448
See application file for complete search history.

(56) References Cited

U.S. PATENT DOCUMENTS 6,771,964 B1 * 8/2004 Einola et al. .................. 455/437
7,260,405 B2    8/2007 Kim et al.
(Continued)

FOREIGN PATENT DOCUMENTS

CN     1338189 A       2/2002
JP     2005-277507 A   10/2005
(Continued)

OTHER PUBLICATIONS

Anonymous, "Draft IEEE Standard for Local and metropolitan area networks Part 16: Air Interface for Fixed and Mobile Broadband Wireless Access Systems Amendment for Physical and Medium Access Control Layers for Combined . . . ," IEEE P802.16e/D5, Sep. 18, 2004, 25 pages, XP-002541507.

(Continued)

*Primary Examiner* — Patrick Edouard
*Assistant Examiner* — Julio Perez
(74) *Attorney, Agent, or Firm* — Birch, Stewart, Kolasch & Birch, LLP (57) ABSTRACT

A method of scanning neighboring target RATs (Radio Access Technology). The method according to one embodiment includes transmitting a message including a field indicating whether or not the mobile station supports the inter-RAT handover while performing a network entry process; transmitting a request for information about another RAT only if the inter-RAT handover is supported by the mobile station; and, in response to the request, receiving information about a recommended RAT from the base station. The information about the recommended RAT is selected based on the location information. The method according to the embodiment further includes performing the scanning of the neighboring target RATs using the information about the recommended RAT; and reporting a result of the scanning. The performing of the scanning is triggered when channel quality falls below a certain threshold. The receiving information is in response to, both, the transmitted message, and the transmitted request.

8 Claims, 8 Drawing Sheets

(51) Int. Cl.
*H04W 36/32* (2009.01)
*H04W 48/18* (2009.01)
*H04W 64/00* (2009.01)

(56) References Cited

U.S. PATENT DOCUMENTS

| | | | |
|---|---|---|---|
| 7,643,830 B2 * | 1/2010 | Catovic et al. | 455/436 |
| 8,046,001 B2 * | 10/2011 | Shalmon et al. | 455/456.3 |
| 8,670,763 B1 * | 3/2014 | Oroskar et al. | 455/437 |
| 2002/0197992 A1 | 12/2002 | Nizri et al. | |
| 2006/0121914 A1 * | 6/2006 | Kim et al. | 455/456.1 |
| 2006/0262767 A1 * | 11/2006 | Peleg et al. | 370/338 |
| 2006/0276189 A1 * | 12/2006 | Kiernan et al. | 455/436 |
| 2007/0004430 A1 | 1/2007 | Hyun et al. | |
| 2007/0015511 A1 * | 1/2007 | Kwun et al. | 455/436 |
| 2007/0021119 A1 * | 1/2007 | Lee et al. | 455/436 |
| 2007/0123260 A1 | 5/2007 | Kim et al. | |
| 2007/0207815 A1 | 9/2007 | Alfano et al. | |
| 2007/0232324 A1 * | 10/2007 | Kim et al. | 455/456.1 |
| 2007/0249366 A1 | 10/2007 | Thomson et al. | |
| 2008/0299978 A1 * | 12/2008 | Benco et al. | 455/437 |

FOREIGN PATENT DOCUMENTS

| | | |
|---|---|---|
| JP | 2006-524931 A | 11/2006 |
| JP | 2007-20162 A | 1/2007 |
| JP | 2008-546267 A | 12/2008 |
| KR | 10-2004-0042649 A | 5/2004 |
| KR | 10-2005-0080884 A | 8/2005 |
| KR | 10-2005-0107533 A | 11/2005 |
| KR | 10-2006-0063623 A | 6/2006 |
| KR | 10-2007-0055713 A | 5/2007 |
| WO | WO 2006/126062 A2 | 11/2006 |

OTHER PUBLICATIONS

Chou et al., "Location Based Services," IEEE 802.16 Broadband Wireless Access Working Group, IEEE C802.16g-06/036r5, Sep. 25, 2006, pp. 1-17, XP-002479078.

* cited by examiner

METHOD OF SCANNING CELLS BASED ON LBS INFORMATION AND SELECTING HETEROGENEOUS CELLS

This application claims the benefit of Korean Patent Application No. 10-2008-0013946, filed on Feb. 15, 2008, which is hereby incorporated by reference as if fully set forth herein.

BACKGROUND OF THE INVENTION

1. Field of the Invention

The present invention relates to mobility between an IEEE 802.16m cell and a non-802.16m cell, and more particularly, to a method of, at a mobile station, scanning neighbor base stations of heterogeneous cells using recommended cells decided by a base station on the basis of location based service (LBS) information of the mobile station.

2. Discussion of the Related Art

An IEEE 802.16m system supports communication between a homogeneous cell and a heterogeneous cell, but the existing IEEE 802.16e system supports only communication between homogeneous cells.

Figure 1:
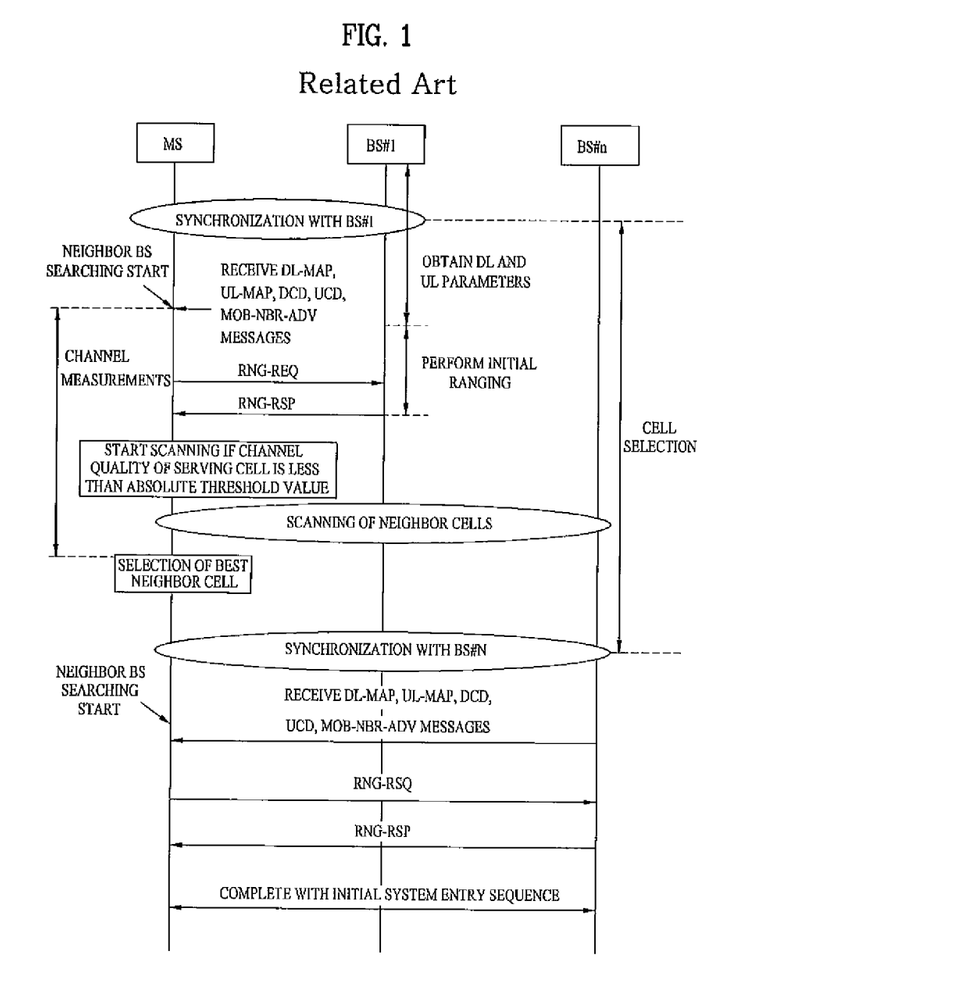
FIG. 1 is a view showing a cell selecting process of an IEEE 802.16e system.

FIG. 1 is a view showing an example of a process of performing cell selection at a mobile station in the IEEE 002.16e system.

When the mobile station is powered on, the mobile station receives downlink/uplink (DL/UL) map and downlink channel descriptor/uplink channel descriptor (DCD/UCD) messages from a current cell, acquires UL/DL parameters, and performs synchronization with a base station. The mobile station performs an initial ranging process and measures a channel state (a carrier to interface and noise ratio (CINR) and a received signal strength indication (RSSI)) of the current cell after performing the synchronization with the base station. If the channel quality of the current cell measured by the mobile station is decreased to a specific threshold value or less, the mobile station scans neighbor cells. If it is determined that a neighbor cell having channel quality higher than that of the current cell is present by the scanned result, a neighbor cell having a highest channel quality is selected. After moving to a new cell, the mobile station performs synchronization with a base station and performs an initial ranging process, similar to the previous cell.

In order to enable the mobile station to perform cell selection between heterogeneous cells, a process of scanning the heterogeneous cells should be first performed. Unlike the cell selection between homogeneous cells, since several heterogeneous cells should be scanned in order to support the cell selection between the heterogeneous cells, a time consumed for scanning is increased and latency of handover and cell selection is increased.

SUMMARY OF THE INVENTION

Accordingly, the present invention is directed to a method for scanning cells based on location information and selecting heterogeneous cells that substantially obviates one or more problems due to limitations and disadvantages of the related art.

An object of the present invention is to provide a method of scanning cells based on location information, which is capable of reducing a time consumed for scanning by scanning optimal cells decided by a base station.

Another object of the present invention is to provide a method of selecting base stations of heterogeneous cells, which is capable of reducing latency of cell selection/reselection/handover of a mobile station by enabling a base station to reduce the number of neighbor heterogeneous cells to be scanned.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of scanning heterogeneous cells in order to perform cell selection or handover between the heterogeneous cells includes: at a mobile station, setting a supplementary field of a registration request message and notifying a base station whether or not handover based on location information is supported, while performing a network entry process; generating location based service (LBS) information while scanning is performed using the coordinates of base stations of an LBS advertisement message received from the base station, if channel quality measured by the mobile station is less than a threshold value; including the generated LBS information in a scanning report message and transmitting the scanning report message to the base station; receiving recommended base station information of the heterogeneous cells selected based on the LBS information from the base station; and performing the scanning on the basis of the recommended base station information.

The LBS information may include at least one of a received signal strength indication (RSSI), a carrier to interference and noise ratio (CINR), an uplink/downlink (UL/DL) time difference of arrival (TDOA) or a time of arrival (TOA).

In the performing of the scanning, the mobile station may perform the scanning on the basis of the recommended base station information for a scanning duration of a scanning response message received in response to a scanning request message of the mobile station.

In the performing of the scanning, the mobile station may perform the scanning on the basis of the recommended base station information during a scanning iteration of a scanning response message received in response to a scanning request message of the mobile station.

In the receiving of the recommended base station information, the mobile station may transmit a scanning request message to the base station and receive the recommended base station information of the heterogeneous cells selected based on the LBS information from the base station.

The recommended base station information may include radio access technology (RAT) identifiers (IDs) and the indexes of the recommended base stations per the RAT IDs.

The method may further include selecting a cell having highest channel quality on the basis of the scanning results.

In another aspect of the present invention, a method of scanning heterogeneous cells in order to perform cell selection or handover between the heterogeneous cells includes: at a mobile station, setting a supplementary field of a registration request message and notifying a base station whether or not handover based on location information is supported, while performing a network entry process; generating location based service (LBS) information while scanning is performed using the coordinates of base stations included in an LBS advertisement message received from the base station, if channel quality measured by the mobile station is less than a threshold value; including the generated LBS information in a scanning request message, transmitting the scanning request message to the base station, and receiving recommended base station information of the heterogeneous cells selected based on the LBS information from the base station; and performing the scanning on the basis of the recommended base station information.

In another aspect of the present invention, a method of selecting heterogeneous base station in order to support cell selection or handover between the heterogeneous cells includes: including the coordinates of base stations in a location based service (LBS) advertisement message and transmitting the LBS advertisement message to a mobile station, when it is determined that handover based on location information is supported from a supplementary field of a registration request message received from the mobile station; receiving the LBS information generated while scanning is performed using the coordinates of the base stations from the mobile station via a scanning report message of the mobile station; and transmitting recommended base station information generated by selecting the base stations of the heterogeneous cells based on the LBS information to the mobile station.

The recommended base station information may include radio access technology (RAT) identifiers (IDs) and the indexes of the recommended base stations per the RAT IDs.

In another aspect of the present invention, a method of selecting heterogeneous base station cells in order to support cell selection or handover between the heterogeneous cells includes: including the coordinates of base stations in a location based service (LBS) advertisement message and transmitting the LBS advertisement message to a mobile station, when it is determined that handover based on location information is supported from a supplementary field of a registration request message received from the mobile station; receiving the LBS information generated while scanning is performed using the coordinates of the base stations from the mobile station via a scanning request message of the mobile station; and transmitting recommended base station information generated by selecting the base stations of the heterogeneous cells based on the LBS information to the mobile station.

The recommended base station information may include radio access technology (RAT) identifiers (IDs) and the indexes of the recommended base stations per the RAT IDs.

According to the embodiments of the present invention, it is possible to reduce a time consumed for scanning performed by the mobile station and reduce latency of cell selection/reselection/handover, by reducing the number of target cells which will be scanned by the mobile station on the basis of location based service (LBS) information of the mobile station in the scanning process which is performed before the cell selection/reselection/handover between the heterogeneous cells.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. However, the following embodiments of the present invention may be variously modified and the range of the present invention is not limited to the following embodiments.

In the present invention, a method of supporting heterogeneous cell selection of a mobile station based on location information will be described in view of a cell selecting process and a signal message used in the cell selecting process.

Figure 2:
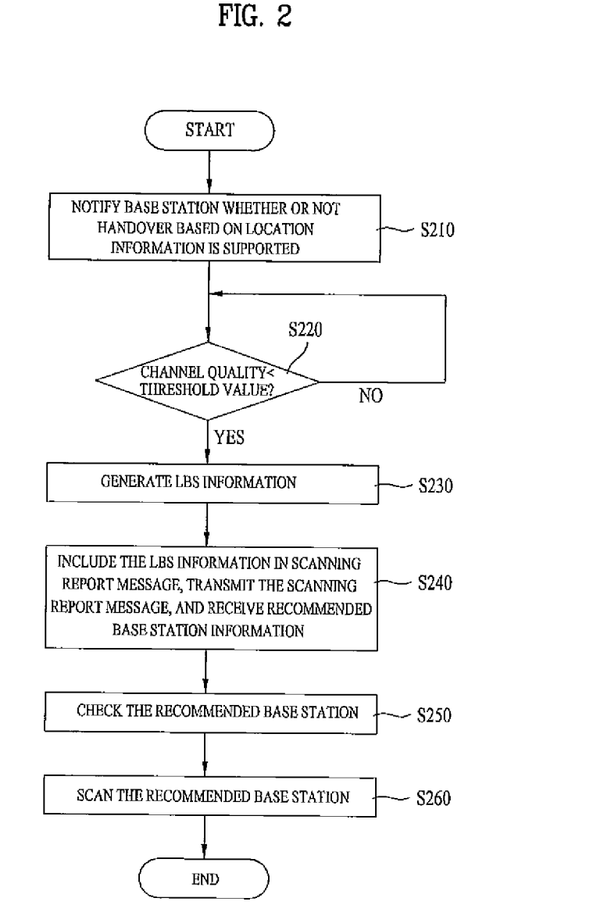
FIG. 2 is a flowchart illustrating a method of scanning cells based on location information according to an embodiment of the present invention.

FIG. 2 is a flowchart illustrating a method of scanning cells based on location information according to an embodiment of the present invention.

First, a mobile station (MS) sets a supplementary field of a registration request message, that is, a handover support field, and notifies a base station (BS) whether or not handover based on location information is supported, while performing a network entry process (S210).

Next, if channel quality measured by the MS is less than a threshold value (S220), location based service (LBS) information is generated while scanning is performed using the coordinates of the BSs included in an LBS advertisement (LBS-ADV) message received from the BS (S230). At this time, if the channel quality is equal to or greater than the threshold value, the following scanning processes (S240 to S260) are deferred.

Next, the LBS information generated by the MS is included in a scanning report (MOB_SCN-REP) message and the scanning report (MOB_SCN-REP) message is transmitted to the BS (S240). The BS selects recommended BSs of heterogeneous cells on the basis of the LBS information and generates recommended BS information. The BS may transmit the recommended BS information to the MS via a response message corresponding to the scanning report (MOB_SCN-REP) message. Alternatively, the BS may transmit the recommended BS information to the MS via a response message corresponding to a scanning request (MOB_SCN-REQ) message for requesting the scanning of the BSs of the heterogeneous cells.

Finally, the MS checks the recommended BSs of the recommended BS information (S250) and scans the checked BSs (S260).

Figure 3:
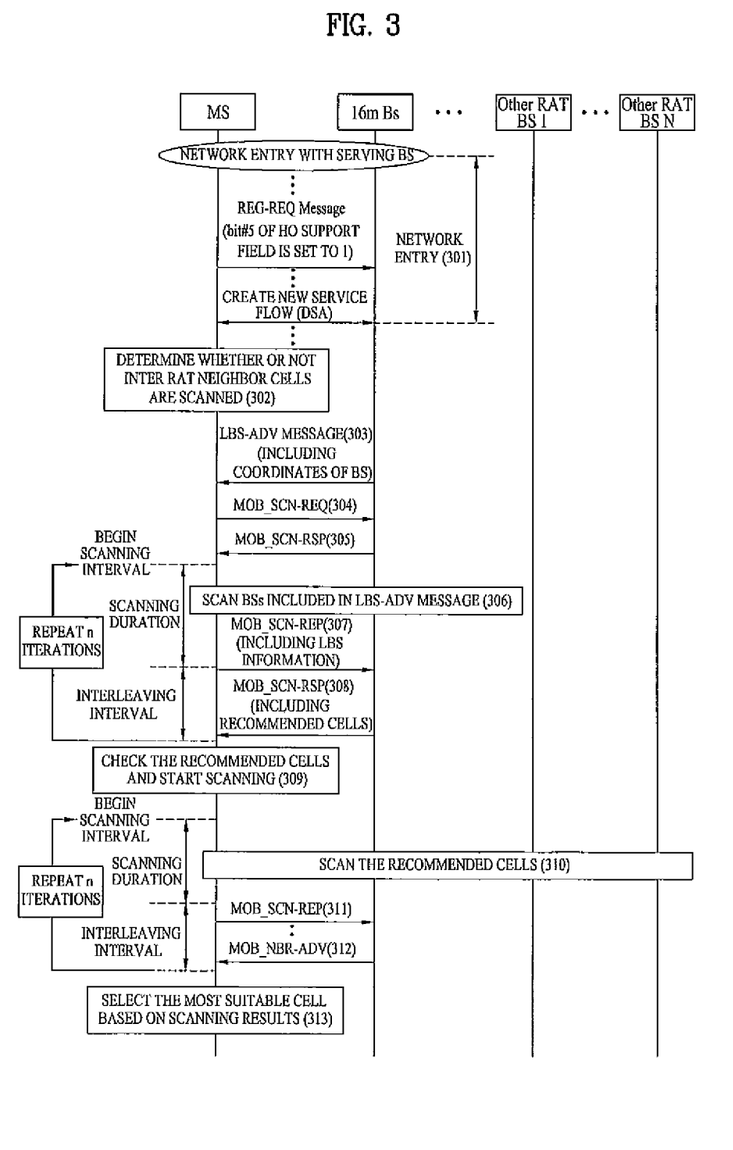
FIG. 3 is a signal flow diagram of the case where recommended base station information is transmitted whenever the base station receives a scanning report message in FIG. 2.

FIG. 3 is a signal flow diagram of the case where the recommended BS information is transmitted whenever the BS receives the scanning report (MOB_SCN-REP) message in FIG. 2.

FIG. 3 shows an example of, at the MS, selecting a cell from an IEEE802.16m cell and cells other than the IEEE 802.16m cell (that is, other radio access technology (RAT) cells).

First, when the MS is powered on, the MS performs synchronization with a serving BS and performs a network entry process including a series of processes such as a registration process (301). In the network entry process (301), in order to perform inter RAT cell selection based on the LBS information, the contents of the handover support field of a registration request (REG-REQ) message transmitted from the MS to the BS is modified. Then, the BS supports the inter RAT cell selection/handover based on the LBS information.

Next, if channel quality of a current cell is less than an absolute threshold value, the MS determines that inter RAT neighbor cells are scanned (302).

The MS periodically receives an LBS advertisement (LBS-ADV) message, from the BS, including the coordinates of at least three BSs including the serving BS and the intra neighbor BSs (303). The MS obtains an uplink/downlink (UL/DL) time difference of arrival (TDOA) using the coordinate information of the BSs. The UL/DL TDOA will be then used for the BS to decide the location of the MS.

Next, the MS transmits a scanning request (MOB_SCN-REQ) message to the BS in order to scan the cells included in the LBS advertisement (LBS-ADV) message (304), and receives a scanning response (MOB_SCN-RSP) message including a scanning duration, an interleaving interval and a scanning iteration from the BS (305).

The MS scans the cells (BSs) included in the LBS advertisement (LBS-ADV) message (306), includes the result value in a scanning report (MOB_SCN-REP) message, and transmits the scanning report (MOB_SCN-REP) message to the BS (307). The scanning report (MBO_SCN-REP) message includes information which will be used to determine the location of the MS by the BS, for example, a received signal strength indication (RSSI), a carrier to interference and noise ratio (CINR), and a UL/DL TDOA.

The BS determines ideal heterogeneous neighbor cells which will be scanned by the MS, that is, recommended cells, in consideration of the LBS information of the MS included in the scanning report (MOB_SCN-REP) message transmitted by the MS and the locations of the heterogeneous neighbor cells detected by the BS. The BS includes the recommended cells in a scanning response (MOB_SCN-RSP) message and transmits the scanning response (MOB_SCN-RSP) message to the MS (308). That is, when the BS receives the scanning report (MOB_SCN-REP) message including information necessary for detecting the location of the MS, although the scanning request (MOB_SCN-REQ) message is not received from the MS, the BS immediately transmits the scanning response (MOB_SCN-RSP) message including the recommended cells to the MS such that the recommended cells are scanned.

Next, the MS confirms the scanning response (MOB_SCN-RSP) message received from the BS and scans the recommended cells (309).

Next, the MS scans the recommended cells for a scanning duration allocated by the BS (310).

The MS receives a downlink message or transmits an uplink message during an interleaving interval allocated by the BS (e.g., a neighbor advertisement (MOB_NBR-ADV) message, a scanning report (MOB_SCN-REP) message or the like) (311 and 312).

In addition, the MS repeatedly performs the scanning process (310) during a scanning iteration.

Finally, the MS selects a heterogeneous neighbor cell having highest channel quality on the basis of the scanning results (313).

The structure of the message used in the present invention is as follows.

The registration request (REQ-REQ) message is one of the messages transmitted from the MS to the BS in the network entry process and serves to make a request for the registration of the function of the MS. The handover support field of the registration request (REQ-REQ) message is modified such that the MS can support cell selection/reselection/handover based on the recommended cells.

Table 1 shows the handover support field of the registration request (REG-REQ) message modified in the present invention.

TABLE 1

| Type | | | |
|---|---|---|---|
| 1 byte | Length | Value (variable length) | Range |
| | 1 | Bit #0: MDHO/FBSS HO supported when it is set to 1. When this bit is set to 0, the BS shall ignore all other bits. Bit #1: MDHO DL RF Combining supported with monitoring MAPs from active BSs when this bit is set to 1. Bit #2: MDHO DL soft Combining supported with monitoring single MAP from anchor BS when this bit is set to 1. Bit #3: MDHO DL soft combining supported with monitoring MAPs from active BSs when this bit is set to 1. Bit #4: MDHO UL multiple transmission Bit #5: If the value is set to 1, inter RAT HO using the LBS is supported. Bits #6-7: Reserved, shall be set to zero. | Registration request (REG-REQ) Registration response (REG-RSP) |

In addition, in order to support cell selection and handover between heterogeneous cells in an IEEE 802.16m system, a trigger TLV description field of a downlink channel description (DCD) message is modified as shown in Table 2.

TABLE 2

| Name | Length (bits) | Value |
|---|---|---|
| Type | 2 MSB) | Trigger metric type: 0x0: CINR metric 0x1: RSSI metric 0x2: RTD metric 0x3: Reserved |
| Function | 3 | Computation defining trigger condition: 0x0: Reserved 0x1: The distance of the neighbor BS is larger than an absolute value. |

TABLE 2-continued

| Name | Length (bits) | Value |
|---|---|---|
| | | 0x2: The distance of the neighbor BS is smaller than the absolute value.
0x3: The distance of the neighbor BS is relatively larger than that of the serving BS.
0x4: The distance of the neighbor BS is relatively smaller than that of the serving BS.
0x5: The distance of the serving BS is larger than an absolute value.
0x6: The distance of the serving BS is smaller than the absolute value.
0x7: Reserved |
| Action | 3 (LSB) | Action performed upon reaching trigger condition:
0x0: Reserved
0x1: Respond on trigger with the scanning report (MOB_SCN-REP) after the end of each scanning interval
0x2: Respond on trigger with MOB_MSHO-REQ
0x3: On trigger, MS starts neighbor BS scanning process by sending the scanning request (MOB_SCN-REQ), by initiating autonomous neighbor cell scanning or both.
0x4: On trigger, MS starts Inter RAT neighbor BS scanning process by sending MOB_SCN-REQ.
0x5-0x7: Reserved
NOTE-0x3 is not applicable when neighbor BS metrics are defined (i.e., only Function values 0x5 or 0x6 are applicable). |

Meanwhile, the scanning response (MOB_SCN-RSP) message is the response to the scanning request (MOB_SCN-REQ) message received from the MS, which is transmitted from the BS to the MS. In order to support inter RAT cell selection/reselection/handover, the BS decides the recommended cells on the basis of the LBS information of the MS and includes the recommended cells in the message, as shown in Table 3. Table 3 shows a portion of the scanning response (MOB_SCN-RSP) message including the recommended cells.

TABLE 3

| Syntax | Size (bits) | Description |
|---|---|---|
| MOB_SCN-RSP_Message_format( ) { | — | — |
| Management Message Type = undecided | 8 | — |
| Scan duratioin | 8 | Units are in frames. |
| Report mode | 2 | 0b00: No report
0b01: Periodic report
0b10: Event-triggered report
0b11: Reserved |
| Reserved | 6 | Shall be set to zero |
| Report period | 8 | If ReportMode is set to 0b01, this is the Report Period, in frames; otherwise this field is set to 0. |
| Report metric | 8 | Bitmap indicating metrics on which the corresponding triggers are based:
Bit 0: BS CINR mean
Bit 1: BS RSSI mean
Bit 2: Relative delay
Bit 3: BS RTD; this metric shall be only measured on serving BS/anchor BS.
Bit 4-7: Reserved; shall be set to zero. |
| ~ | | |
| If (scan duration != 0) { | — | — |
| Start frame | 8 | — |
| Interleaving interval | 8 | Duration in frames. |
| Scan iteration | 8 | — |
| RAT ID | 8 | 1 indicates support, 0 indicates not support:
Bit #0: 16 m
Bit #1-7: Reserved |
| If (RAT ID [0] == 1) { | | |
| Recommended cell index | 8 | Number of scanned or associated neighbor BSs. These BSs use the BS indexes corresponding to the position of BS in MOB_NBR-ADV) message. |
| ~ //omitted | | |
| }// End of RAT ID[0] | | |

TABLE 3-continued

| Syntax | Size (bits) | Description |
|---|---|---|
| RAT ID[1] ~ [6] "If" sentence is performed | | Including recommended cell identifiers per RAT IDs and scanning types, similar to RAT ID[0]. |
| If (RAT ID [7] == 1) { ~ } //End of RAT ID [7] | | |
| Padding | Variable | If needed for alignment to byte boundary. |
| }//End of scan interval TLV encoded information | Variable | — |
| } //END of MOB_SCN-RSP | | |

Figure 4:
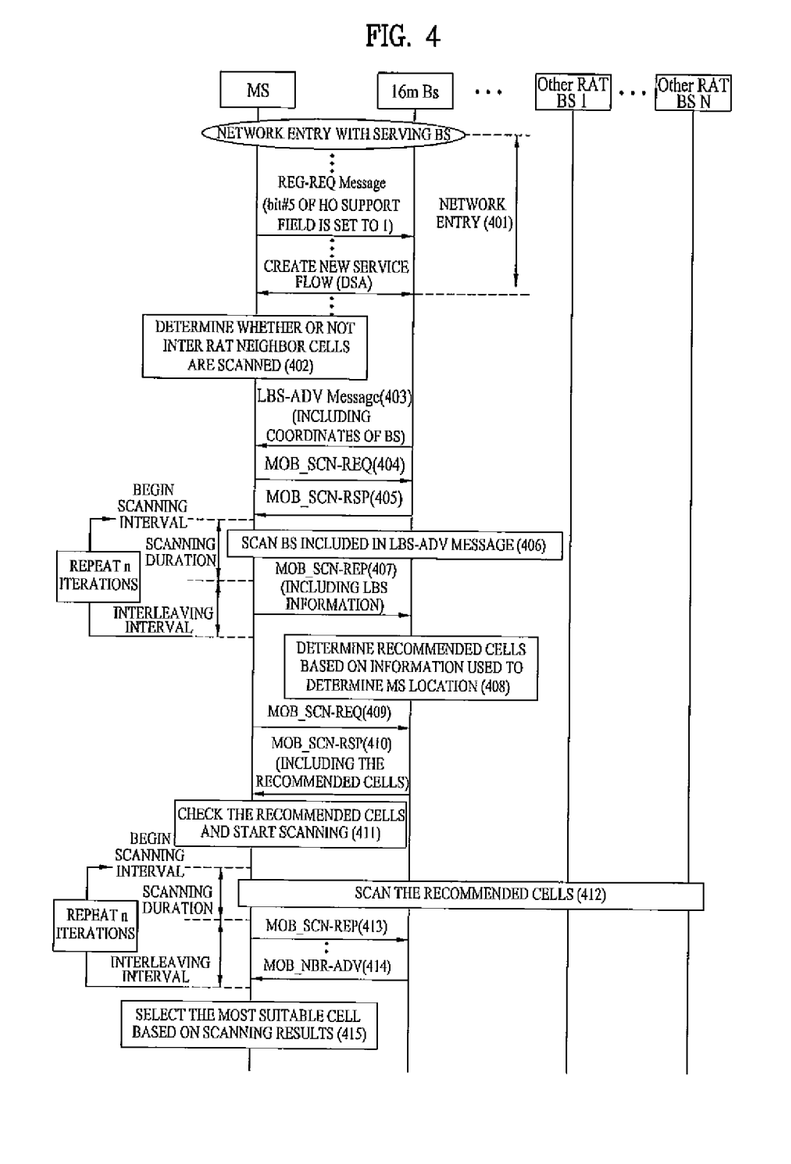
FIG. 4 is a signal flow diagram of the case where information recommended by a base station is transmitted only when the base station receives a scanning request message in FIG. 2.

FIG. 4 is a signal flow diagram of the case where the recommended BS information is transmitted only when the BS receives the scanning request (MOB_SCN-REQ) message in FIG. 2.

First, when an MS is powered on, the MS performs synchronization with a serving BS and performs a network entry process including a series of processes such as a registration process (401). In the network entry process (401), in order to perform inter RAT cell selection based on the LBS information, the contents of the handover support field of a registration request (REG-REQ) message transmitted from the MS to the BS is modified. Then, the BS supports the inter RAT cell selection/handover based on the LBS information.

Next, if channel quality of a current cell is less than an absolute threshold value, the MS determines that inter RAT neighbor cells are scanned (402).

The MS periodically receives, from the BS, an LBS advertisement (LBS-ADV) message including the coordinates of at least three BSs including the serving BS and the intra neighbor BSs (403). The MS obtains a UL/DL TDOA using the coordinate information of the BSs. The UL/DL TDOA will be then used for the BS to decide the location of the MS.

Next, the MS transmits a scanning request (MOB_SCN-REQ) message to the BS in order to scan the cells included in the LBS advertisement (LBS-ADV) message (404), and receives a scanning response (MOB_SCN-RSP) message including a scanning interval, an interleaving interval and a scanning iteration from the BS (405).

The MS scans the cells (BSs) included in the LBS advertisement (LBS-ADV) message (406), includes the result value in a scanning report (MOB_SCN-REP) message, and transmits the scanning report (MOB_SCN-REP) message to the BS (407). The scanning report (MBO_SCN-REP) message includes information which will be used for deciding the location of the MS by the BS, for example, an RSSI, a CINR, and a UL/DL TDOA.

The BS decides ideal heterogeneous neighbor cells which will be scanned by the MS, that is, recommended cells, in consideration of information used for deciding the location of the MS included in the scanning report (MOB_SCN-REP) message and the locations of the heterogeneous neighbor cells detected by the BS (408). In FIG. 4, the BS does not transmit a scanning response (MOB_SCN-RSP) message including the recommended cells to the MS in response to the scanning report (MOB_SCN-REP) message of the MS.

The MS transmits a scanning request (MOB_SCN-REQ) message to the BS in order to receive the scanning response (MOB_SCN-RSP) message including the ideal recommended cells to be scanned from the BS (409).

The BS includes the recommended cells in the scanning response (MOB_SCN-RSP) message and transmits the scanning response (MOB_SCN-RSP) message to the MS (410).

Next, the MS checks the scanning response (MOB_SCN-RSP) message received from the BS and scans the recommended cells (411).

The MS scans the recommended cells for a scanning duration allocated by the BS (412).

The MS receives a downlink message or transmits an uplink message during an interleaving interval allocated by the BS (e.g., a neighbor advertisement (MOB_NBR-ADV) message, a scanning report (MOB_SCN-REP) message or the like) (413 and 414). In addition, the MS repeatedly performs the scanning process (412) during a scanning iteration.

Finally, the MS selects a heterogeneous neighbor cell having highest channel quality on the basis of the scanning results (415).

Figure 5:
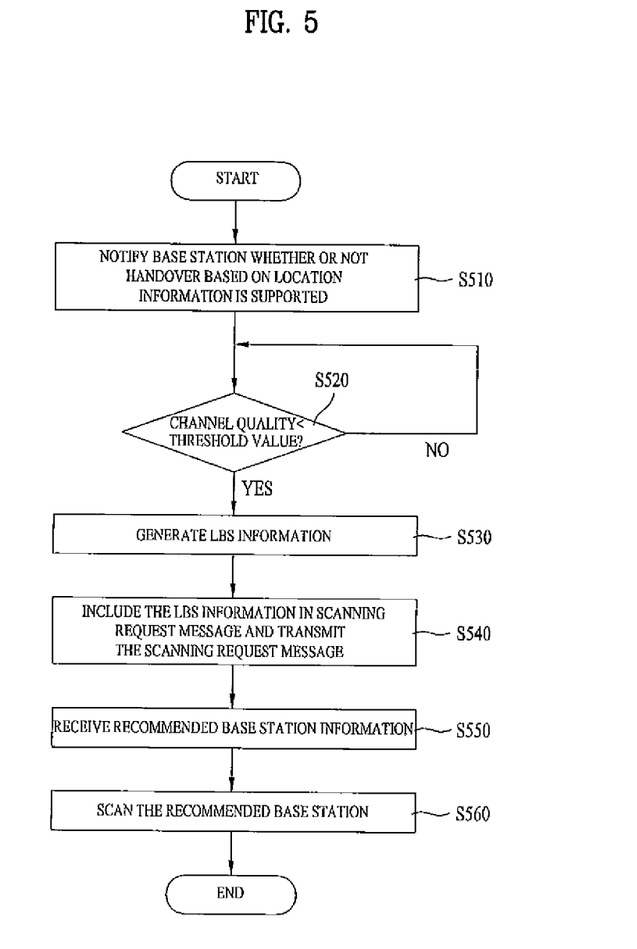
FIG. 5 is a flowchart illustrating a method of scanning cells based on location information according to another embodiment of the present invention.

FIG. 5 is a flowchart illustrating a method of scanning cells based on location information according to another embodiment of the present invention.

The embodiment of FIG. 5 includes a process of, at an MS, including information necessary for obtaining the location information of the MS in a scanning request (MOB_SCN-REQ) message and transmitting the scanning request (MOB_SCN-REQ) message to a BS.

First, the MS sets a supplementary field of a registration request message, that is, a handover support field, and notifies the BS whether or not handover based on location information is supported, while performing a network entry process (S510).

Next, if channel quality measured by the MS is less than a threshold value (S520), the LBS information is generated while scanning is performed using the coordinates of the BSs included in an LBS advertisement (LBS-ADV) message received from the BS (S530). At this time, if the channel quality is equal to or greater than the threshold value, the following scanning processes (S540 to S560) are deferred.

The LBS information generated by the MS is included in a scanning request (MOB_SCN-REQ) message and the scanning request (MOB_SCN-REQ) message is transmitted to the BS (S540). Next, recommended BS information selected based on the LBS information is received from the BS (S550).

Finally, the scanning is performed on the basis of the recommended BS information (S560).

Figure 6:
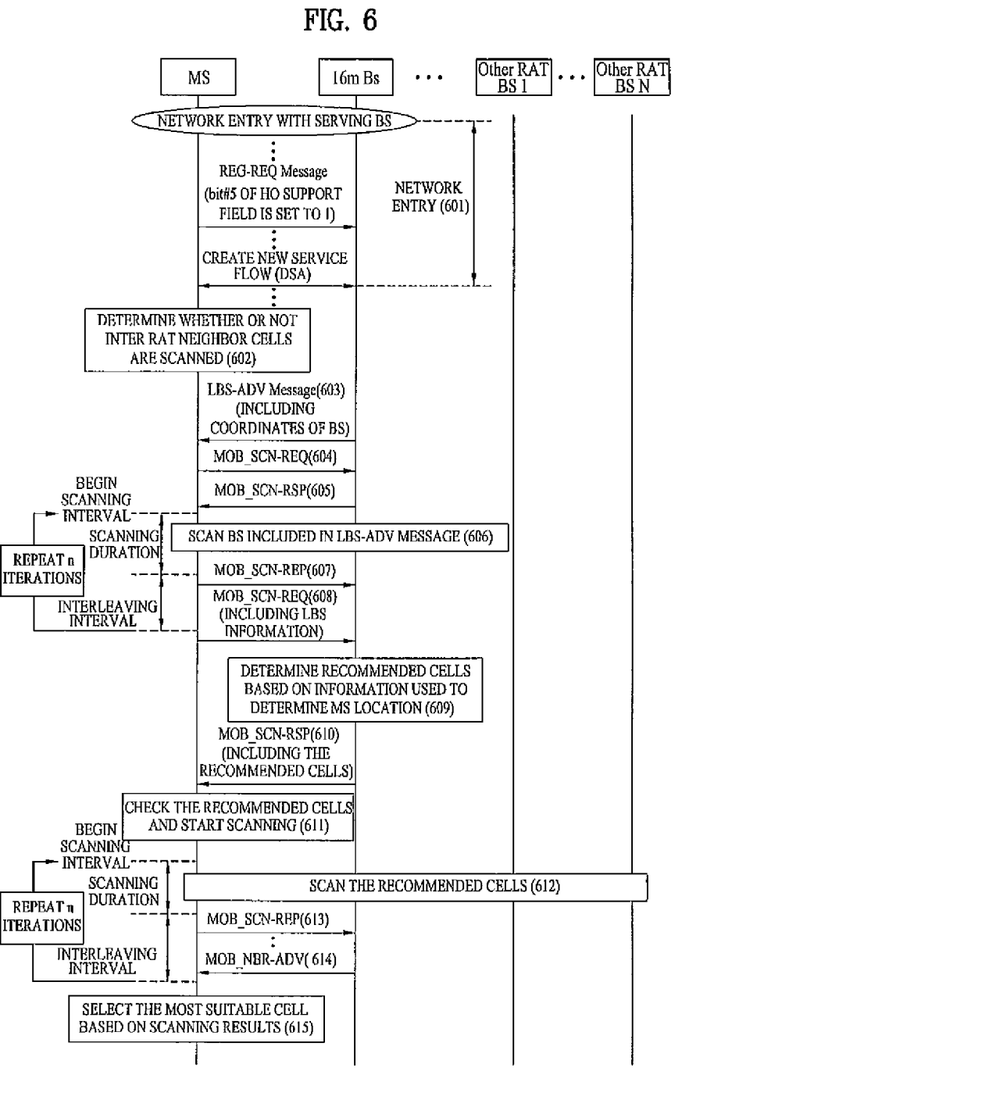
FIG. 6 is a signal flow diagram of FIG. 5.

FIG. 6 is a signal flow diagram of FIG. 5.

FIG. 6 shows a method of, as a BS, deciding recommended cells based on information included in a scanning request (MOB_SCN-REQ) message transmitted by an MS and transmitting the recommended cells to the MS.

First, when the MS is powered on, the MS performs synchronization with a serving BS and performs a network entry process including a series of processes such as a registration process (601). In the network entry process (601), in order to perform inter RAT cell selection based on the LBS information, the contents of the handover support field of a registration request (REG-REQ) message transmitted from the MS to the BS is modified. Then, the BS supports the inter RAT cell selection/handover based on the LBS information.

Next, if channel quality of a current cell is less than an absolute threshold value, the MS determines that inter RAT neighbor cells are scanned (602).

The MS periodically receives an LBS advertisement (LBS-ADV) message including the coordinates of at least three BSs including the serving BS and the intra neighbor BSs from the BS (603). The MS obtains a UL/DL TDOA using the coordinate information of the BSs. The UL/DL TDOA will be then used for the BS to decide the location of the MS.

Next, the MS transmits a scanning request (MOB_SCN-REQ) message to the BS in order to scan the cells included in the LBS advertisement (LBS-ADV) message (604), and receives a scanning response (MOB_SCN-RSP) message including a scanning duration, an interleaving interval and a scanning iteration from the BS (605).

The MS scans the cells included in the LBS advertisement (LBS-ADV) message and other homogeneous neighbor cells included in the scanning response (MOB_SCN-RSP) (606).

The MS includes the result value in a scanning report (MOB_SCN-REP) message, and transmits the scanning report (MOB_SCN-REP) message to the BS (607).

The MS transmits a scanning request (MOB_SCN-REQ) message to the BS in order to receive the scanning response (MOB_SCN-RSP) including the ideal recommended cells to be scanned (608). The scanning request (MBO_SCN-REQ) message includes information which will be used for deciding the location of the MS by the BS, for example, an RSSI, a CINR, and a UL/DL TDOA.

The BS decides ideal heterogeneous neighbor cells which will be scanned by the MS, that is, recommended cells, in consideration of information used for deciding the location of the MS included in the scanning request (MOB_SCN-REQ) message and the locations of the heterogeneous neighbor cells detected by the BS (609).

The BS includes the recommended cells in the scanning response (MOB_SCN-RSP) message and transmits the scanning response (MOB_SCN-RSP) message to the MS (610).

Next, the MS checks the scanning response (MOB_SCN-RSP) message received from the BS and scans the recommended cells (611).

The MS scans the recommended cells for a scanning duration allocated by the BS (612).

The MS receives a downlink message or transmits an uplink message during an interleaving interval allocated by the BS (e.g., a neighbor advertisement (MOB_NBR-ADV) message, a scanning report (MOB_SCN-REP) message or the like) (613 and 614). In addition, the MS repeatedly performs the scanning process (612) during a scanning iteration.

Finally, the MS selects a heterogeneous neighbor cell having highest channel quality on the basis of the scanning results (615).

Figure 7:
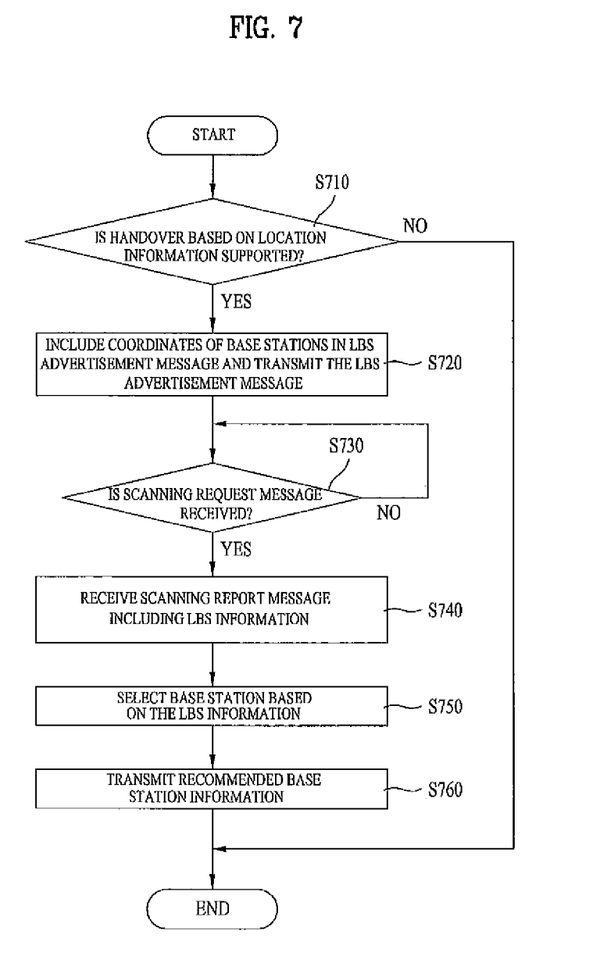
FIG. 7 is a flowchart illustrating a method of selecting heterogeneous cell according to an embodiment of the present invention.

FIG. 7 is a flowchart illustrating a method of selecting heterogeneous cells according to an embodiment of the present invention.

If it is determined that handover based on location information is supported from a supplementary field of a registration request message received from an MS (S710), the coordinates of BSs are included in an LBS advertisement (LBS-ADV) message of a BS and the LBS advertisement (LBS-ADV) message is transmitted to the MS (S720). At this time, if it is determined that the handover based on location information is not supported, the following process is not performed.

Next, if the MS transmits a scanning request (MOB_SCN-REQ) message to the BS, the following process is performed (S730).

The LBS information generated while scanning is performed using the coordinates of the BSs is received from the MS via a scanning report (MOB_SCN-REP) message of the MS (S740). The step (S740) of receiving the scanning report (MOB_SCN-REP) message may be repeatedly performed during a scanning iteration decided by the serving BS.

Next, the BSs of heterogeneous cells are selected on the basis of the LBS information (S750).

Next, information about the selected BSs, that is, the recommended BSs, is transmitted to the MS via a scanning response (MOB_SCN-RSP) message (S760).

At this time, the BS may transmit the scanning response (MOB_SCN-RSP) message including the recommended BS information to the MS in response to the scanning report (MOB_SCN-REP) message. Alternatively, if the MS transmits the scanning request (MOB_SCN-REQ) message to the BS after the scanning iteration decided by the serving BS is finished, the scanning response (MOB_SCN-RSP) message including the recommended BS information may be transmitted to the MS.

Figure 8:
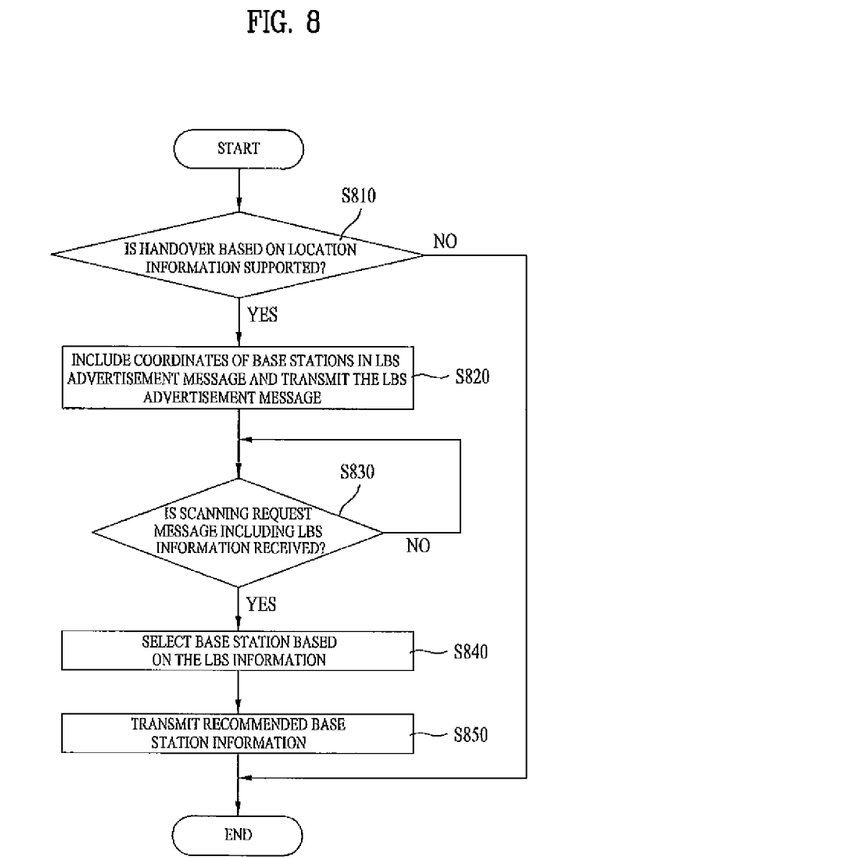
FIG. 8 is a flowchart illustrating a method of selecting heterogeneous cell according to another embodiment of the present invention.

FIG. 8 is a flowchart illustrating a method of selecting heterogeneous cells according to another embodiment of the present invention.

If it is determined that handover based on location information is supported from a supplementary field of a registration request message received from an MS (S810), the coordinates of BSs are included in an LBS advertisement (LBS-ADV) message of a BS and the LBS advertisement (LBS-ADV) message is transmitted to the MS (S820). At this time, if it is determined that the handover based on location information is not supported, the following process is not performed.

Next, the MS transmits a scanning request (MOB_SCN-REQ) message to the BS, and generates LBS information while scanning is performed using the coordinates of the BSs.

If the BS receives a scanning request (MOB_SCN-REQ) message including the LBS information (S830), the BSs of heterogeneous cells are selected on the basis of the LBS information (S840).

Finally, information about the selected BSs, that is, the recommended BSs, is transmitted to the MS via a scanning response (MOB_SCN-RSP) message (S850).

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

The present invention provides a method of shortening a time consumed for performing selection/reselection/handover between heterogeneous cells by an MS. The present invention is applicable to cell selection/reselection/handover between the homogeneous cells of IEEE 802.16m as well as selection/reselection/handover between the IEEE 802.16m cell and heterogeneous cell and is applicable to apparatuses such as mobile stations and base stations.

What is claimed is:

1. A method of scanning neighboring target RATs (Radio Access Technology) by a mobile station in order to perform inter-RAT handover, the method comprising:

transmitting, by the mobile station to a base station, a message including a field indicating whether or not the mobile station supports the inter-RAT handover while performing a network entry process;

transmitting, by the mobile station, a request for information about another RAT, to the base station only if the inter-RAT handover is supported by the mobile station;

in response to the request, receiving, by the mobile station, information about a recommended RAT from the base station, wherein the information about the recommended RAT is selected based on the location information of the mobile station and includes identifiers of base stations of the recommended RAT;

performing, by the mobile station, the scanning of the neighboring target RATs using the information about the recommended RAT; and reporting, by the mobile station, a result of the scanning to the base station, wherein the performing of the scanning is triggered when channel quality on a current RAT, which the base station is serving, falls below a certain threshold, and wherein the receiving, by the mobile station, information about a recommended RAT from the base station is in response to, both, the transmitted message including the field indicating whether or not the mobile station supports the inter-RAT handover, and the transmitted request for information about another RAT only if the inter-RAT handover is supported by the mobile station.

2. The method according to claim 1, wherein the performing of the scanning includes performing the scanning for a scanning duration.

3. The method according to claim 1, further comprising selecting a base station of the recommended RAT having a highest channel quality based on a result of the scanning.

4. A method of selecting neighboring target RATs (Radio Access Technology) by a base station in order to support inter-RAT handover for a mobile station, the method comprising:

receiving, by the base station from the mobile station, a message including a field indicating whether or not the mobile station supports the inter-RAT handover while performing a network entry process;

receiving, by the base station, a request for information about another RAT from the mobile station only if the inter-RAT handover is supported by the mobile station;

in response to the request, transmitting, by the base station, information about a recommended RAT to the mobile station, wherein the information about the recommended RAT is selected based on the location information of the mobile station and includes identifiers of base stations of the recommend RAT; and receiving, by the base station, a result of scanning from mobile station, the scanning being performed by the mobile station using the information about the recommended RAT, wherein the performing of the scanning is triggered when channel quality on a current RAT, which the base station is serving, falls below a certain threshold, and wherein the transmitting, by the base station, information about a recommended RAT to the mobile station is in response to, both, the received message including the field indicating whether or not the mobile station supports the inter-RAT handover, and the received request for information about another RAT only if the inter-RAT handover is supported by the mobile station.

5. The method according to claim 4, wherein the result of scanning includes at least one of a received signal strength indication (RSSI), a carrier to interference and noise ratio (CINR), an uplink/downlink (UL/DL) time difference of arrival (TDOA), a time of arrival (TOA) and relative delay (RD) from the mobile station.

6. A mobile station configured to scan neighboring target RATs (Radio Access Technology) in order to perform inter-RAT handover in a wireless access system, the mobile station comprising:

a processor; and a radio frequency (RF) module transmitting and receiving a radio signal to and from the outside under the control of the processor, wherein the processor is configured to:

transmit, to a base station, a message including a field indicating whether or not the mobile station supports an inter-RAT handover while performing a network entry process, transmit a request for information about another RAT, to the base station only if the inter-RAT handover is supported by the mobile station, in response to the request, receive, from the base station, information about a recommended RAT, wherein the information about the recommended RAT is selected based on the location information of the mobile station and includes identifiers of base stations of the recommended RAT, perform the scanning of the neighboring target RAT using the information about the recommended RAT, and report a result of the scanning to the base station, wherein the performing of the scanning is triggered when channel quality on the current RAT falls below a certain threshold, and wherein the receiving, from the base station, information about a recommended RAT is in response to, both, the transmitted message including the field indicating whether or not the mobile station supports the inter-RAT handover, and the transmitted request for information about another RAT only if the inter-RAT handover is supported by the mobile station.

7. The mobile station according to claim 6, wherein the processor is configured to perform the scanning for a scanning duration received from the base station.

8. The mobile station according to claim 6, wherein the processor is configured to select a base station of the recommended RAT having a highest channel quality based on a result of the scanning.

* * * * *